US009307156B1

(12) United States Patent
Sinfield et al.

(10) Patent No.: US 9,307,156 B1
(45) Date of Patent: Apr. 5, 2016

(54) LONGWAVE INFRARED IMAGING OF A HIGH-TEMPERATURE, HIGH-INTENSITY LIGHT SOURCE

(71) Applicants: Matthew Sinfield, Gaithersburg, MD (US); Dennis M. Lueken, McLean, VA (US); Brian J. Setlik, Reston, VA (US)

(72) Inventors: Matthew Sinfield, Gaithersburg, MD (US); Dennis M. Lueken, McLean, VA (US); Brian J. Setlik, Reston, VA (US)

( * ) Notice: Subject to any disclaimer, the term of this patent is extended or adjusted under 35 U.S.C. 154(b) by 162 days.

(21) Appl. No.: 14/134,484

(22) Filed: Dec. 19, 2013

(51) Int. Cl.
*H04N 5/235* (2006.01)

(52) U.S. Cl.
CPC ..................................... *H04N 5/235* (2013.01)

(58) Field of Classification Search
CPC .............................. H04N 5/2254; G02B 27/46
USPC .......................................................... 348/342
See application file for complete search history.

(56) References Cited

U.S. PATENT DOCUMENTS

| | | | |
|---|---|---|---|
| 5,475,198 | A | 12/1995 | Burke et al. |
| 5,493,126 | A | 2/1996 | Taylor et al. |
| 6,919,988 | B2 | 7/2005 | Cook |
| 6,969,176 | B2 | 11/2005 | Pohle |
| 8,102,306 | B2 | 1/2012 | Smith, Jr. et al. |
| 8,379,329 | B2 | 2/2013 | Nakayama et al. |
| 8,466,964 | B2 | 6/2013 | Gat et al. |
| 8,564,663 | B2 | 10/2013 | Plemons et al. |
| 2009/0084764 | A1* | 4/2009 | Park et al. ............... 219/121.63 |
| 2009/0244745 | A1* | 10/2009 | Komuro ........................ 359/885 |
| 2013/0128361 | A1* | 5/2013 | Okaniwa et al. ............. 359/580 |

FOREIGN PATENT DOCUMENTS

EP 0092753 B1 9/1998

OTHER PUBLICATIONS

D. Farson, R. Richardson, and X. Li, "Infrared Measurement of Base Metal Temperature in Gas Tungsten Arc Welding," Welding Journal, Welding Research Supplement, Sep. 1998, vol. 9, pp. 396s-401s.
X. Ma and Y. Zhang, "Gas Metal Arc Weld Pool Surface Imaging: Modeling and Processing," Welding Journal, Welding Research (Supplement to the Welding Journal), May 2011, vol. 90, pp. 85S-94S.
Y.-S. Kim and T.W. Eagar, "Metal Transfer in Pulsed Current Gas Metal Arc Welding," Welding Journal, Welding Research (Supplement to the Welding Journal), Jul. 1993, pp. 279S-287s.

(Continued)

*Primary Examiner* — Fayez Bhuiyan
(74) *Attorney, Agent, or Firm* — Howard Kaiser

(57) ABSTRACT

A neutral density (ND) filter made of an LWIR-transmissive, heat-resistant material is interposed between a longwave infrared (LWIR) imager and an entity that is highly emanative of both light and heat. According to exemplary inventive practice, the ND filter is a thermoplastic (e.g., polystyrene) sheet characterized by a thickness in the 1-2 mm range and a thermal conductivity $\le 0.13$ W/m-K. Important parameters of the ND filter include LWIR transmittance (which depends on material and thickness) and thermal conductivity (which depends on material). The quality of the image taken of the entity is affected by the respective degrees of LWIR attenuation by, and heating up of, the ND filter. Accordingly, the material and the thickness of the ND filter are selected to optimize the image, in particular so as to avoid saturation and/or whiting-out of the image due to insufficient LWIR attenuation and/or excessive ND filter temperature.

16 Claims, 9 Drawing Sheets

(56) References Cited

OTHER PUBLICATIONS

David H. Terry, Michael E. Thomas, Milton J. Linevsky, and Daniel T. Prendergast, "Imaging Pyrometry of Laser-Heated Sapphire," Johns Hopkins APL Technical Digest, vol. 20, No. 2, 1999, pp. 162-169.

Antoni Rogalski, "Infrared Detectors: An Overview," Infrared Physics & Technology, The Institute of Physics, vol. 43, 2002, pp. 187-210.

J.F. Lancaster, "The Physics of Welding," Physical Technology, vol. 15, 1984, pp. 73-79.

* cited by examiner

LONGWAVE INFRARED IMAGING OF A HIGH-TEMPERATURE, HIGH-INTENSITY LIGHT SOURCE

BACKGROUND OF THE INVENTION

The present invention relates to electromagnetic imaging, more particularly to methods, systems, and computer programs for obtaining electromagnetic images of objects characterized by high-temperature, high-intensity light.

Various electromagnetic spectral band regions—for instance, visible light, radio, infrared, x-rays, etc.—have been used to detect objects or obtain images of objects. Active detecting/imaging devices (e.g., radar devices) transmit electromagnetic radiation (e.g., radio signals) to detect or image objects. Passive detecting/imaging devices do not transmit electromagnetic radiation, but instead receive naturally occurring electromagnetic signals that are emitted or reflected by objects.

In the electromagnetic spectrum, the infrared (IR) region is characterized by longer wavelengths than the visual region. The IR region extends between the visual region and approximately one millimeter in wavelength. The millimeter wave region has longer wavelengths than the IR region and shorter wavelengths than the radar (including microwaves and radio waves) region. Passive electro-optic devices and light-intensification devices operate in the visible spectrum. Passive IR devices are based on the phenomenon of natural radiation of IR energy by all "warm" objects in accordance with thermal radiative transfer physics.

The terms "electromagnetic image," "photographic image," and "photograph" are used synonymously herein to broadly refer to any image, still (e.g., "snapshot") or moving (e.g., "video"), created by recording visible light or other electromagnetic radiation. For instance, electromagnetic radiation can be chemically recorded using a light-sensitive material such as photographic film, or electronically recorded using an image sensor.

Welding is a fabrication process typically involving the melting of metal workpieces. A filler material is added to form a "weld pool," which cools to form a joint of the metal workpieces. Sometimes pressure is applied in conjunction with heat. A type of welding known as "arc welding" implements a welding power supply to create an electric arc ("welding arc") between an electrode and a base material, thereby melting the metals at the welding point. It is often desirable to remotely observe in-situ, during fabrication, the dynamics of the welding arc and weld pool, in order to monitor the quality of the weld or to study phenomenological aspects of the weld.

Current methods of remotely observing optical welding systems focus primarily on using filtered visual light, with or without external lighting, to reduce or suppress the arc light interference. However, conventional approaches can suffer significant degradation of the overall image quality. Rejection by filters of specific wavelengths of light can be detrimental to complete imaging of the weld pool and welding arc. Camera systems that use external laser lighting to suppress specific arc radiation wavelengths have practical drawbacks such as high equipment costs, occupational safety issues associated with high power lasers, and system integration challenges; these drawbacks have largely relegated the use of external lighting welding arc imaging to research applications.

Attempts to image the welding process by mitigating radiation interference have employed such techniques as filtering, arc interruption, external lighting, and UDR photography. These techniques have worked with varying degrees of success. Examples of filtering are arc light band-pass filtering and neutral density filtering (i.e., signal attenuation). Arc light band-pass filtering typically involves rejection of a specific wavelength range of radiation. Neutral density filtering typically involves signal attenuation. Arc interruption typically involves current pulsing. External illumination has been provided, for instance, by back lighting using powerful lasers.

Charge coupled device (CCD) and complementary metal-oxide semiconductor (CMOS) video cameras operating in the visible to the near infrared spectra, equipped with band-pass and/or neutral density filters and external lighting, have been combined to image the weld pool and arc in real-time. Real-time image processing algorithms, such as ultra-dynamic range (UDR) photography, have been used to enhance quality of an image. UDR photography algorithms seek to optimize an image by piecing together the best portions of a series of consecutive photos taken over a range of exposure levels. However, UDR photography delays image broadcast and decreases video frame rate, resulting in "jumpy" video that ostensibly is real-time but actually is less than real-time.

A gas tungsten arc welding (GTAW) process has been observed using optical cameras, but this has required implementation of filtering technique(s) and/or image processing. Most commercially available visible-light to near-infrared arc cameras perform adequately with low-current welding processes that do not transfer metal across the arc, such as gas tungsten arc welding (GTAW). A gas metal arc welding (GMAW) process typically operates at a higher deposition rate and higher arc currents, thus creating a much hotter arc with higher radiance. Observation of a GMAW process using optical cameras thus requires an even greater degree of filtering and/or image processing.

Observation has been conducted of a GMAW-P process, which is a type of GMAW process that uses pulsed welding currents or synergic controlled pulsed currents. The rapidly changing pulsed welding currents create a fluctuating range of spectral radiation that band-pass filters cannot filter without eliminating some of the needed information to construct a complete image. UDR photography algorithms attempt to correct for this, but none are proficient at doing so; they tend to create choppy images due to decreased video frame rates.

Infrared (IR) weld monitoring has been used primarily for near-weld pool thermography, but not used specifically for weld pool imaging. Band-pass filtering of the arc light has been performed to improve the quality of the near-weld pool data; however, the radiance of the arc radiance, and the reflection of arc light off the surface of the weld pool, create noise that reduces quality of the image. Due in part to the difficulty of resolving the significant amount of IR interference caused by the intense, complex radiation of welding arcs, early researchers focused their attention on near-weld pool thermography rather than on weld pool or arc imaging. Moreover, the dramatic thermal gradients existing between welding arcs and surrounding material, coupled with IR detector limits of the time, further confounded both IR data and resulting imagery.

The following references, each of which is incorporated herein by reference, are informative regarding sensing and imaging of welds and welding: D. Farson, R. Richardson, and X. Li, "Infrared Measurement of Base Metal Temperature in Gas Tungsten Arc Welding," *Welding Journal*, Welding Research Supplement, September 1998, Volume 9, pages 396s-401s; Lillquist, European Patent Specification EP 0092753 B1, "Infrared Sensor for Arc Welding," publication date 11 Sep. 1988; X. Ma and Y. Zhang, "Gas Metal Arc Weld Pool Surface Imaging: Modeling and Processing," *Welding Journal*, Supplement to the Welding Journal, May 2011, Volume 90, pages 85S-94S; Burke et al., U.S. Pat. No. 5,475,198, "Weld Pool Viewing System," issue date 12 Dec. 1995.

SUMMARY OF THE INVENTION

In view of the foregoing, an object of the present invention is to provide an improved methodology for obtaining images of objects that are characterized by high-temperature, high-intensity light emanation, such as images of arc welding sites.

In accordance with exemplary embodiments of the present invention, an imaging apparatus includes a camera and a neutral density filter. The camera is operable in the longwave infrared spectral region of electromagnetic radiation. The neutral density filter is characterized by transmission of longwave infrared radiation and by resistance to heat. The imaging apparatus is capable of producing at least one image of an entity that emanates electromagnetic radiation and heat. The neutral density filter is positioned between the camera and the entity. The neutral density filter attenuates longwave infrared radiation emanating from the entity, and resists heat emanating from the entity. The camera receives longwave infrared radiation attenuated by the neutral density filter.

The present invention can be practiced in various applications with respect to various subjects of photographic imaging. Inventive practice is possible with respect to practically any high-intensity light source. Embodiment of the present invention is possible, for instance, as a method, a system, or an apparatus. The present invention is particularly efficacious as an imaging methodology for applications involving remote in-situ observation of the dynamics of welding, including manifestations of a welding arc and a weld pool during fabrication of the weld. Imaging of weld dynamics can serve, for instance, to facilitate monitoring of the quality of a welding process, and/or further study of phenomena associated with a welding process.

Generally speaking, infrared radiation has been used previously for imaging (e.g., monitoring) weld processes. The present invention's methodology is new, featuring in particular its unique utilization of infrared radiation for conducting imaging of weld processes. According to exemplary inventive practice in which welding dynamics (e.g., welding arc and weld pool) are observed, imaging is performed using attenuated longwave infrared radiation originating from the welding site. The present invention admits of practice for rendering effective observation of diverse types of arc welding processes, including the following: gas tungsten arc welding (GTAW); gas metal arc welding (GMAW) by spray metal transfer; pulsed gas metal arc welding (GMAW-P); shielded metal arc welding (SMAW); flux cored arc welding (FCAW).

Among the novel features of exemplary practice of the present invention are the following: (i) implementation of a longwave infrared radiation (LWIR) thermal-photography camera to photograph an arc welding site; (ii) implementation of a neutral density (ND) filter to attenuate LWIR radiation emanating from the arc welding site; and, (iii) capture by the LWIR camera of ND-filter-attenuated LWIR to generate a thermal photographic image of the arc welding site. "Longwave infrared radiation" (abbreviated herein as "longwave IR" or "LWIR") is defined herein as the electromagnetic spectral band characterized by a wavelength $\lambda$ in the approximate range between 7 µm and 14 µm, inclusive.

Inventive practice affords several possible advantages, especially in terms of costs and performance. Many inventive embodiments require relatively simple equipment. The present invention's novelty of using a neutral density filter to attenuate LWIR radiation is less expensive, as compared to the conventional use of precision optical band-pass filters. The overall image quality and video frame rate of inventively produced images may be superior to those of conventionally produced images. Inventive practice offers dependability, as it is proven effective in viewing details (e.g., arcs and weld pools) of welding processes such as a pulsed gas metal arc welding. Unlike previous approaches to weld-pool and/or welding-arc imaging (such as CCD/CMOS-based cameras), the present invention does not use band-pass filters or external lighting, and does not collect IR radiation in the near, short-wave or midwave IR spectra, which are more sensitive than the longwave IR spectrum.

An important feature of exemplary inventive practice is its implementation of an uncooled longwave IR imager (camera), such as an uncooled microbolometer longwave IR camera. A cooled midwave IR imager is less suitable than an uncooled longwave IR imager for imaging high levels of intensity. Saturation of an image will likely occur in a cooled midwave IR imager, due to the higher sensitivities of the cooled midwave IR imager at uncooled (e.g., room or ambient) temperatures. Hence, vis-à-vis an uncooled longwave IR imager, a cooled midwave IR imager will necessitate filtering out a greater amount of emitted thermal energy, such as by using a more substantial filtering material.

Exemplary inventive practice implements a controllable uncooled longwave (e.g., operable in the wavelength $\lambda$ range of approximately 7.5 µm-14 µm, inclusive) IR camera in conjunction with a neutral density (ND) filter. The present inventors obtained successful test results using a thin transparent polystyrene window as the ND filter. The clear plastic polystyrene pane reduced the intensity of the electromagnetic radiation emanating from the arc weld, and thereby reduced the saturation of the LWIR camera's focal plane array by the LWIR radiation included in the electromagnetic radiation. The controllable uncooled longwave IR camera served to reduce overall radiance sensitivity, as compared with other types of cameras. The thin transparent polystyrene window served to reduce the welding arc IR radiation saturation of the IR camera's focal plane array.

The present invention's performance of weld pool/welding arc imaging/monitoring using attenuated LWIR to create images is previously unknown. Typically, as compared with a cooled midwave IR camera, an uncooled LWIR camera has significantly less overall sensitivity to thermal radiance. Therefore, in combination with an uncooled LWIR camera, a relatively moderate amount of filtering will be necessary to attenuate the thermal energy emanating from the object being imaged. Accordingly, the present invention represents an elegant solution whereby an infrared camera that is less prone to saturation is used concomitantly with a neutral density filter that is less prone to thermal overheating and optical distortion.

BRIEF DESCRIPTION OF THE DRAWINGS

The present invention will now be described, by way of example, with reference to the accompanying drawings, wherein:

FIG. 7 indicates the elements (arc; weld pool; welding electrode; solidified weld metal; weld torch gas cup) of the pulsed gas metal arc welding process that is depicted.

DESCRIPTION OF EXEMPLARY
EMBODIMENTS OF THE INVENTION

Figure 1:
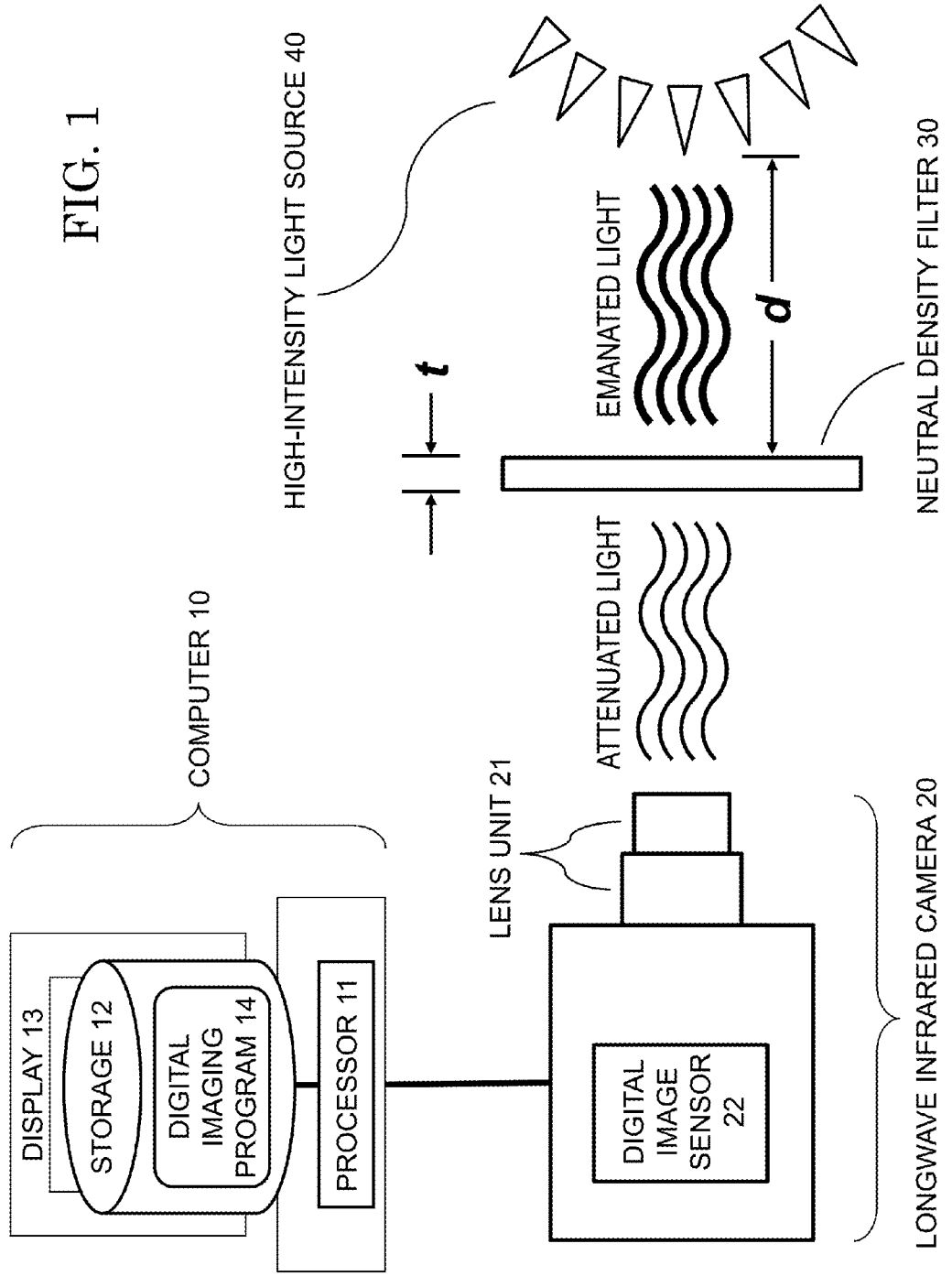
FIG. 1 is a schematic illustrating exemplary practice, in accordance with the present invention, of longwave infrared imaging of a high-intensity light source such as an arc weld site.

Referring now to the figures, according to exemplary practice of the present invention, thermal imaging is conducted of an arc welding process. As illustrated in FIG. 1, an exemplary inventive configuration for imaging a high temperature, high-intensity light source 40 includes a computer system 10, a longwave infrared (LWIR) camera/imager 20, and a neutral density (ND) filter 30. FIG. 1 is diagrammatic in nature and is not intended to convey spatial or dimensional preferences.

Computer system 10 includes a processor 11, a memory/storage 12 (both volatile and non-volatile), and a display 13. Neutral density (ND) filter 30 has a thickness t and is situated between a longwave infrared camera 20 and a light source 40 (such as an arc welding process). ND filter 30 is situated at a distance d from light source 40 and is nearer to camera 20 than to light source 40, according to exemplary inventive practice. LWIR camera 20, an uncooled thermal imaging camera, includes a lens unit 21 (e.g., including at least one lens and having an aperture) and a digital image sensor 22. The light source 40 is characterized by high temperature and high electromagnetic intensity.

LWIR transmission by the ND filter is an important component of inventive practice. In applications involving high-temperature heat sources (e.g., arc weld sites) as imaging subjects, usually both LWIR transmission and thermal (heat) conductivity are important aspects of the present invention's ND filter. According to exemplary inventive practice, ND filter 30 is an LWIR-transmissive and heat-resistive thermoplastic (e.g., polystyrene) sheet. Electromagnetic radiation emanating from light source 40 is attenuated by ND filter 30 before the electromagnetic radiation reaches the camera 20. Of particular significance, longwave infrared radiation emanating from light source 40 is attenuated by ND filter 30 before the longwave infrared radiation reaches the longwave infrared camera 20.

Resident in the memory/storage 12 of computer 100, and embodied in computer code, is a digital imaging computer program 14, which controls and records images taken by longwave infrared (LWIR) camera 20. Computer program 14 can be a conventional digital imaging program, many of which are equipped with noise-filtering capability to improve the image resolution, e.g., pixel resolution. Software that is particularly geared for thermal imaging is commercially available.

The electronic images that appear on display 13 are made up of very small dots commonly known as "pixels." "Pixel" is a common technical term that came into being as a shortened expression for "picture element." Generally speaking, pixels are very small dots that make up electronic images such as those seen on televisions or computer displays. A typical electronic image (e.g., a graphic image on a computer screen) is divided into a matrix of thousands or millions of pixels. The electronic image is represented as a large two-dimensional array of brightness and/or color values for pixels.

Terms such as "thermal imager," "thermal camera," "thermal imaging camera," and "thermal photography camera" are used interchangeably herein to broadly refer to an imaging device that uses thermal energy. According to exemplary inventive practice, camera 20 is an uncooled thermal imager operating in the LWIR spectral band, defined herein to have a wavelength λ in the range of 7.5-14 μm. Camera 20 is a passive IR device. Image sensor 22 of thermal imaging camera 20 includes multiple uncooled detectors arranged in a "focal plane array."

Generally speaking, every object emits a quantity of infrared radiation as a function of the object's temperature; that is, the hotter the object, the greater the emission of thermal radiation. There are currently two main thermal imaging technologies, viz., cooled thermal imaging and uncooled thermal imaging. Both categories of thermal imagers are commercially available, but the cooled thermal imagers tend to be larger, heavier, more power-consumptive, and more expensive than uncooled thermal imagers. For instance, a commercially available cooled MWIR imager may exceed ten pounds in weight in order to accommodate its ability to chill its focal plane array to 77K, and may carry at least five times the price of a commercially available uncooled microbolometer LWIR imager having similar specifications.

Cooled thermal imagers have cryogenically cooled detectors, and operate in the midwave infrared (MWIR) spectral band. Their cryogenic coolers serve to reduce thermally induced noise, since at higher temperatures the cryogenically cooled detectors become flooded by their own thermal radiation. In general, a cooled thermal imager is considerably more sensitive to thermal energy than an uncooled thermal imager.

Uncooled thermal imagers have uncooled detectors, do not require cryogenic temperatures, and operate in the longwave infrared (LWIR) spectral band. High-resolution uncooled thermal imagers are commercially available at affordable prices. Thermal detection by uncooled thermal imagers uses secondary effects to create images. A typical uncooled thermal imager contains a focal plane array (FPA), a two-dimensional array of detectors used for obtaining a two-dimensional image. Two basic types of uncooled thermal imagers are the microbolometer detector type and the ferroelectric detector type. Most microbolometer detectors contain a vanadium oxide resistor, but some contain an amorphous silicon resistor.

The present inventors tested the use of a controllable cooled midwave IR camera to observe flux cored arc weld pool dynamics during welding torch oscillation. However, this effort involving use of a MWIR camera met with little success, because the intensity of the arc's IR radiation was saturating the image. The extremely intense infrared radiation emanating from the welding arc saturated the camera's focal plane array, thus obscuring both the arc and weld pool shapes.

Exemplary embodiments of the present invention implement an LWIR camera to observe the weld pool dynamics during arc oscillation of a flux cored arc weld. The present inventors tested the use of a controllable uncooled microbolometer longwave IR camera to observe flux cored arc weld pool dynamics during welding torch oscillation. They found that, by using an LWIR camera in conjunction with a thin transparent plastic window placed in front of the LWIR camera's lens, the intensity of the weld arc's IR radiation impinging upon the camera focal plane array was reduced. That is, the amount of overall IR radiation being collected by the LWIR camera was reduced.

The present inventors fit an LWIR camera with a 1.56 mm thick transparent polystyrene window, and thereby successfully observed the welding arc and weld pool dynamics during welding torch oscillation of a flux cored arc weld. The present inventors repeated their experimentation with respect to a pulsed gas metal arc welding process and a shielded metal arc welding process, and also obtained successful results. In association with each of the various kinds of welding processes, the observed radiance in the infrared spectrum was reduced.

In exemplary inventive practice, a main intent is not to correlate the LWIR data to actual temperatures (e.g., thermography). Rather, a main intent of exemplary inventive practice is to achieve high quality video and images of the welding arc and weld pool during welding, to be used for both real-time and post-process qualitative and quantitative analysis. The direct observation of the arc welding process during fabrication represents an in-situ means of monitoring weld quality. The high-quality images produced through inventive practice can be used for enhanced thermography, remote welding applications, and adaptive welding controls for both seam tracking and in-situ parameter adjustment.

As exemplified by FIGS. 3 and 7 through 9, a series of arc welding images was made by the present invention using LWIR attenuated by a 1.56 mm thick transparent polystyrene neutral density filter. The present inventors successfully monitored welding arc and weld pool dynamics, particularly as they accomplished this without allowing the welding arc's intensity and neighboring reflections to hot-saturate the infrared imager. An uncooled longwave IR camera 20 was coupled with a 1.56 mm thin polystyrene window, viz., ND filter 30. At the extremely high temperatures of these arc weld processes, the arc intensity was significantly lower in magnitude in the longwave infrared region (7-14 μm) than the arc intensity would have been in the midwave infrared region (3-5 μm). The 1.56 mm polystyrene ND filter 30 was a planar transparent polystyrene portion of a commercially available jewel case designed for containing a cd or dvd disc.

Figure 3:
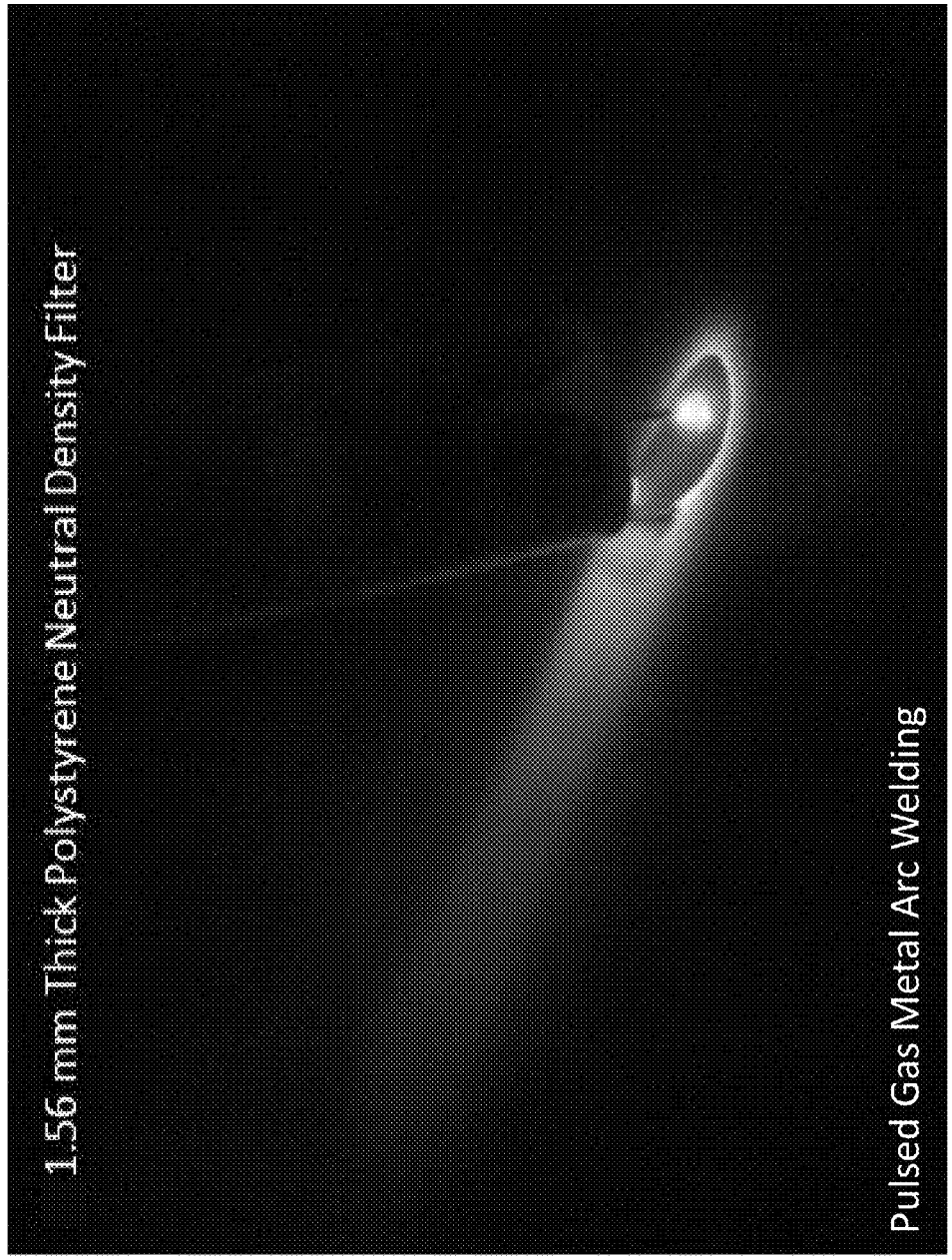
FIG. 3 is an example of a thermal image taken, in accordance with the present invention, of the pulsed gas metal arc welding process illustrated in FIG. 2. The image shown in FIG. 3 was obtained using a neutral density filter made of transparent polystyrene, having a planar shape, and having a thickness of 1.56 millimeters.

Polystyrene ND filter 30 provided, in the longwave IR spectrum, an effectual degree of attenuation of the extreme-temperature illumination of the welding arc. The longwave IR that reached the longwave IR imager 20 was and remained below the maximum allowable IR intensity of the longwave IR imager 20, that is, below the threshold IR intensity at which saturation of longwave IR imager 20's focal plane array would occur. As illustrated by FIG. 3, a 1.56 mm thickness of the polystyrene sheet achieved a superior level of LWIR attenuation. Based on their experimental data, the present inventors deem an approximate preferred working range for thickness t of a polystyrene ND filter to be 1 mm<θ<2 mm.

A fifteen degree field-of-view (FOV) lens 21 was used with the longwave imager, and permitted the images to be taken as close as eighteen inches between the FOV lens 21 and the arc weld (high-intensity light source) 40. If longwave IR imager 20 were mounted to the moment arm of a robot or a mechanized welding system, and a wider FOV lens were implemented, then longwave IR imager 20 would have been able to achieve an even closer distance to the weld 40.

Figure 7:
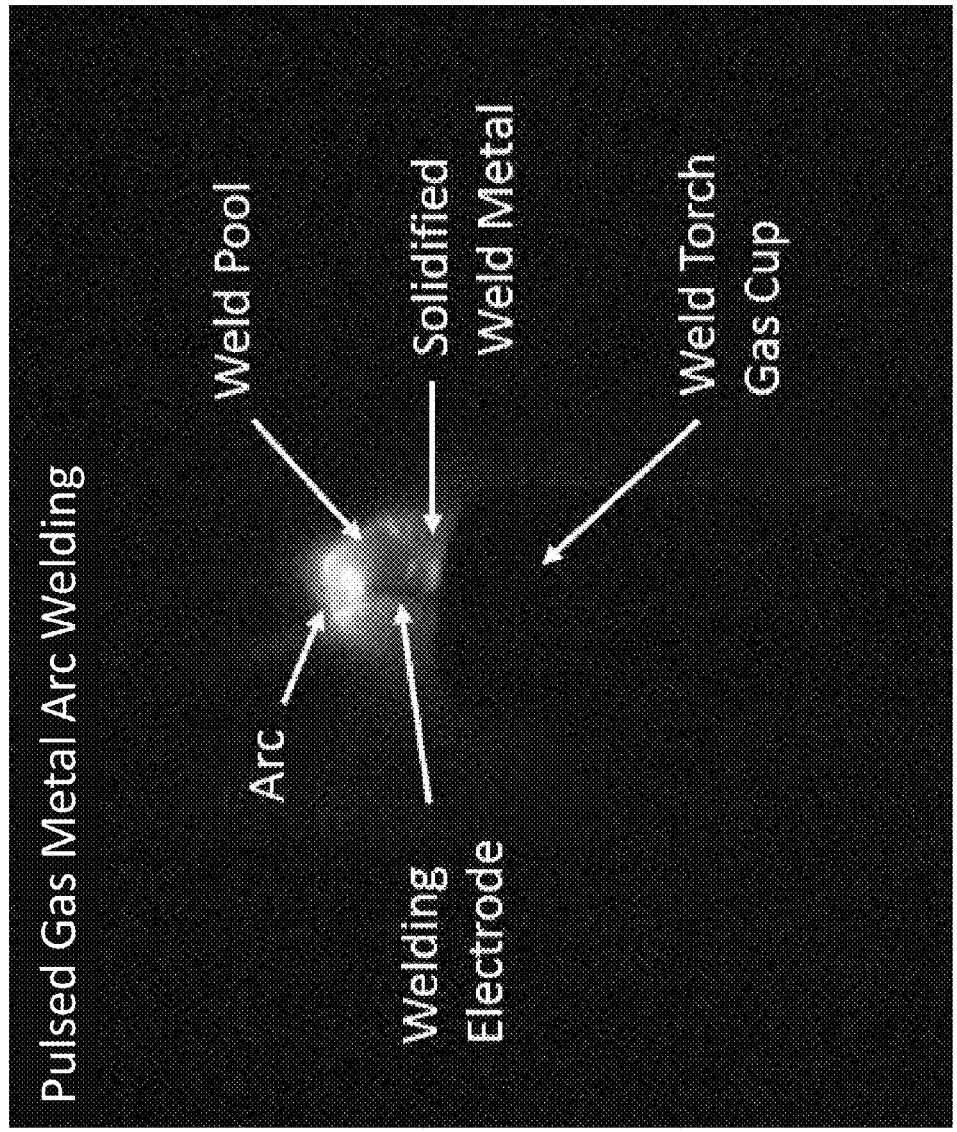
FIG. 7 is an example of a thermal image taken, in accordance with the present invention, of a different pulsed gas metal arc welding process from that illustrated in FIGS. 2 through 4. Like the image shown in FIG. 3, the image shown in FIG. 7 was obtained using a neutral density filter made of transparent polystyrene, having a planar shape, and having a thickness of 1.56 millimeters.
Figure 8:
FIG. 8 is an example of a thermal image taken, in accordance with the present invention, of a shielded metal arc welding process. Like the images shown in FIGS. 3 and 7, the image shown in FIG. 8 was obtained using a neutral density filter made of transparent polystyrene, having a planar shape, and having a thickness of 1.56 millimeters.
Figure 9:
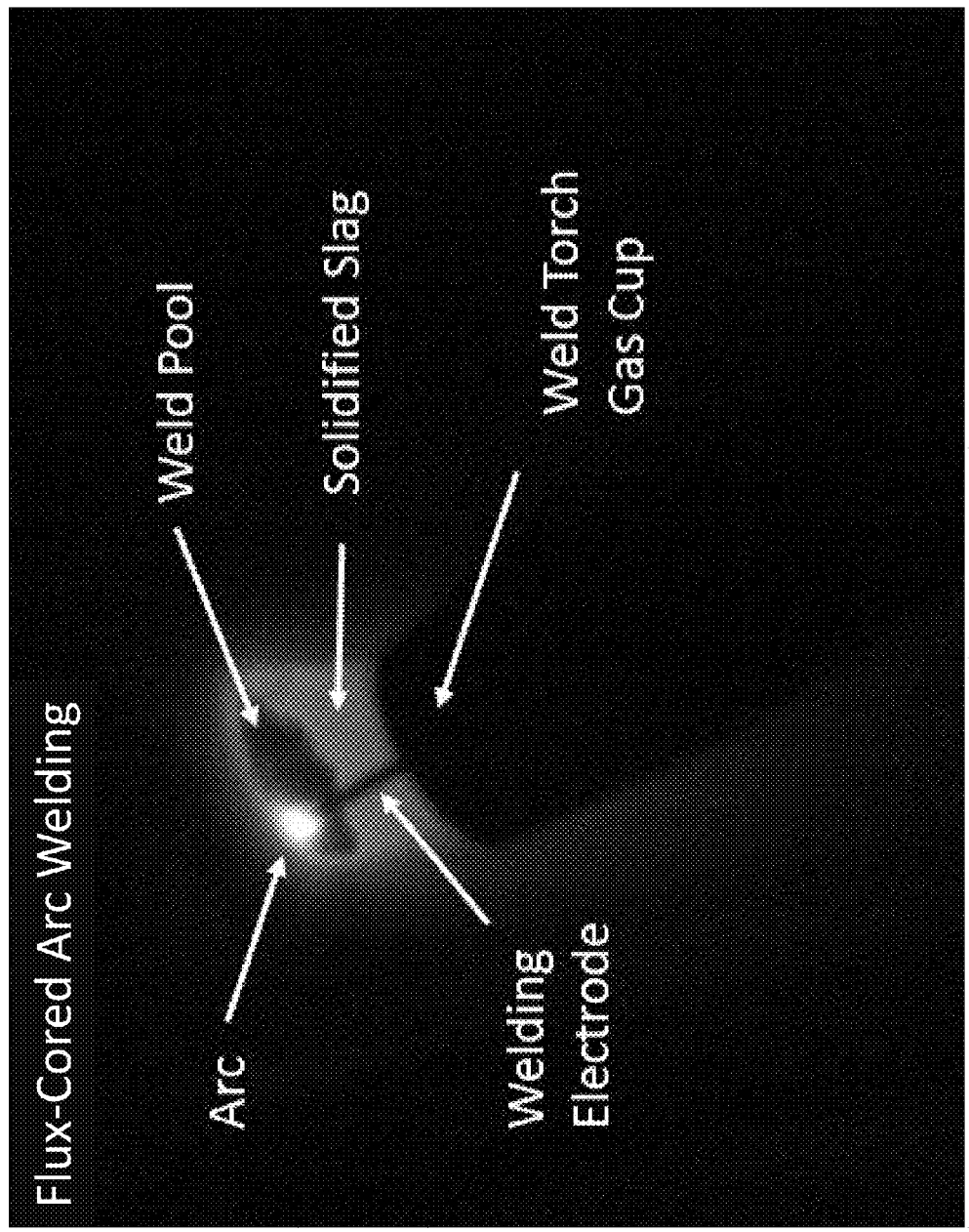
FIG. 9 is an example of a thermal image taken, in accordance with the present invention, of a flux-cored arc welding process. Like the images shown in FIGS. 3, 7 and 8, the image shown in FIG. 9 was obtained using a neutral density filter made of polystyrene, having a planar shape, and having a thickness of 1.56 millimeters.

FIG. 3 and FIG. 7 each show an inventively produced image of a weld made via a GMAW-P (pulsed gas metal arc welding) process. FIG. 8 shows an inventively produced image of a weld made via an SMAW (shielded metal arc welding) process. FIG. 9 shows an inventively produced image of a weld made via an FCAW (flux-cored arc welding) process. The welding arc and weld pool images of FIGS. 3 and 7 through 9 were produced in high-strength steel through performance of attenuated IR imaging method in accordance with the present invention. The images shown in FIGS. 3 and 7 through 9 were each taken using the same uncooled microbolometer longwave imager 20 and the same 1.56 mm thick polystyrene neutral density filter 30.

Applications involving visual weld process monitoring, including monitoring of a welding arc and weld pool, are notable among the diverse applications for which the present invention can be practiced efficaciously. Inventive practice of visual weld process monitoring differs in significant respects from prior attempts at visual weld process monitoring, including but not limited to the respects stated in the following paragraph.

The present invention is designed using LWIR for imaging, not for thermography. Furthermore, as usually practiced, the present invention utilizes only the LWIR (7-14 μm) radiation generated during arc welding. In inventive testing, the LWIR generated during the arc welding process was used to create the image of the weld pool and the welding arc. LWIR was used to image both the molten weld pool and the welding arc in real-time at 25 fps, producing results of high-quality 14-bit video imagery. Moreover, no band-pass filtering is employed by the present invention; that is, according to exemplary inventive practice, there is no rejection of specific wavelengths of radiation in order to suppress the welding arc radiance. In addition, according to exemplary inventive practice, the LWIR intensity is attenuated, by an estimated transmittance reduction of 100×, using only a transparent polystyrene neutral density filter between 1.0-2.5 mm thick, optimized at 1.5 mm. Finally, the present invention's LWIR welding-arc and weld-pool monitoring system operates without the need for supplemental external illumination.

In order to image a high-temperature, high intensity light source such as a weld (e.g., weld pool and welding arc), exemplary inventive practice includes: computer collection of the IR data in the LWIR spectrum using a controllable uncooled digital LWIR camera; and, suppression of the IR signal using a neutral density filter at a particular magnitude of attenuation. A typical commercially available longwave infrared camera is in the genre of thermal-imaging photography, utilizing thermal radiation to create images. By implementing a conventional LWIR camera and a suitable neutral density filter, the present invention succeeds in reducing the overall IR signal sensitivity and intensity (i.e. the overall number of photons collected) to a sufficient degree to enable the LWIR camera to image the welding process in full detail without focal plane array saturation.

Key considerations in exemplary inventive practice are (i) thickness, and (ii) material, of the neutral density filter. In order to achieve an optimal or near-optimal "window" for transmitting infrared radiation emanating from the light source, a balance should be drawn between (a) the material type of the ND filter and (b) the thickness t of the ND density filter. The ND filter should constitute an efficient LWIR transmittance operability window, one which enables adequate viewing of the weld pool and welding arc, doing so without saturating the LWIR camera's image focal plane array.

In selecting a suitable material for constituting the present invention's ND filter material, properties that may be worthy of consideration include structural properties, optical properties, thermal properties, and mechanical properties. Other factors include weight, cost, and compatibility with existing equipment. Structural properties that may be pertinent to selection of an ND filter material include crystallinity (amorphous, semi-amorphous/semi-crystalline, crystalline, etc.). Optical properties that may be pertinent include clarity (transparent, translucent, opaque, clear, etc.), transmittance, refractive index, reflective index, and dispersion index. Thermal properties that may be pertinent include thermal conductivity, thermal expansion coefficient, and melting temperature. Mechanical properties that may be pertinent include Young's modulus, shear modulus, elastic stiffness, hardness, and yield strength.

The "human eye test" may be the most important criterion in the decision-making process for selecting the material and the thickness of the ND filter. This may involve, to some extent, a "trial-and-error" approach to selecting a superior ND filter and noting its efficacious characteristics. An inventive practitioner can view and thereby evaluate a series of images obtained with varying materials and/or varying thicknesses, exercising his/her subjective judgment. For instance, the images depicted in FIGS. 2 through 5 illustrate the visual comparative approach taken by the present inventors in selecting 1.56 mm (FIG. 3) as the best thickness among the four thicknesses tested, as the image shown in FIG. 3 was the best image among the four images obtained. Their evaluation was furthered through scientific analysis such as graphically represented by FIG. 6. Commercially available photography software may assist the inventive practitioner in conducting the multi-image comparisons.

Transmittance of electromagnetic radiation is conventionally expressed as a percentage of the incident electromagnetic radiation that is transmitted through a body; expressed another way, transmittance is the ratio of "light out" to "light in." Transmittance through a sheet, for instance, is a function of the material of the sheet and the thickness of the sheet. The thicker the sheet, the greater the attenuation (e.g., absorbance), and hence the lower the transmittance. Every material has its own LWIR transmittance characteristics.

Light transmission curves, obtained from the literature or via spectrophotometry, can inform an inventive practitioner regarding LWIR transmittances of individual materials. Using a device such as an IR spectrometer, transmission curves (e.g., transmission % versus wavelength) can be obtained by an inventive practitioner for varying ND filter materials and/or at varying ND filter thicknesses. For instance, the transmission curves can provide a "signature" of an optimized combination of material and thickness of the ND filter for a particular application.

Inventive practice such as described herein by way of example demands consideration of the suitability of a material to constitute the ND filter under circumstances of being subjected to extreme high temperatures associated with the welding process being imaged. The present inventors' test results suggest a relationship between the thermal conductivity of the ND filter material, and the efficacy of the ND filter in the context of inventive practice.

According to exemplary inventive practice, during imaging the ND filter is caused to heat up due to its proximity to the high-temperature light source. The overheating of the ND filter results in a degradation of the image, which may manifest in the image as insufficient contrast, e.g., a "washing out" or "blanking out" or "whiting out" of the image. There are two phenomena that may adversely affect the image when the ND filter is exposed to the extreme heat of an arc weld process. Firstly, the increase in thermal transmission by the ND filter may have concomitant therewith an increase in LWIR transmission by the ND filter, hence causing the LWIR camera's image focal plan array to saturate. Secondly, the uniform temperature distribution occurring across the ND filter as it heats may cause de-contrasting of the image, e.g., the "going to white" of the image.

The present invention's ND filter should be made of a suitable material at least in the respects of LWIR transmission and heat resistance. Through experimental testing, the present inventors determined that the material of the neutral density filter should be sufficiently temperature-resistant to the radiant welding light as to not overheat during welding. Three material types were tested, viz., transparent polystyrene, transparent polycarbonate, and transparent polyvinyl chloride (PVC). Based on test results, polystyrene appears to be a suitable ND filter material for many inventive embodiments. On the other hand, polycarbonate and PVC appear to be unsuitable ND filter materials for many inventive embodiments. Neither the polycarbonate ND filter nor the PVC ND filter worked well in the testing conducted by the present inventors; in particular, each ND filter began to heat up while viewing the arc, resulting in washing out of the image. Of the three materials tested, transparent polystyrene was found to perform the most effectively.

Basically speaking, "thermal conductivity," "thermal conduction," "thermal resistivity," and "thermal resistance" are conventional terms representing the material property of conducting heat. Thermal resistivity is the reciprocal of thermal conductivity. Thermal conductivity is measurable as an ability of a material to conduct heat, and is commonly designated as a quantity of heat transmitted through a unit thickness of a material in a direction normal to a surface of unit area.

Table 1, below, sets forth values, gleamed from the literature, of five different material properties (thermal conductivity, coefficient of thermal expansion, refractive index, clarity, and crystallinity) with respect to each of six different thermoplastic materials (polystyrene, polycarbonate, un-plasticized polyvinylchloride, polymethylmethacrylate, polypropylene, and low-density polyethylene). The two adjacent thermal conductivity columns list approximately equal values, but in different units. As shown in the table, the three tested thermoplastics are characterized by, respectively, the following approximate ranges of thermal conductivities at room temperature (approximately 23° C.): polycarbonate, in the range 0.19-0.22 W/m-K; polyvinyl chloride, in the range 0.12-0.25 W/m-K; polystyrene, in the range 0.10-0.13 W/m-K.

TABLE 1

Selected Properties of Selected Thermoplastics

| Thermoplastic | Thermal Conductivity (W/m K) (at 23° C.) | Thermal Conductivity (cal/s cm K × $10^6$) (at 23° C.) | Coefficient of Linear Thermal Expansion ($10^{-6}$ m/m K) | Index of Refraction | Clarity | Crystallinity |
|---|---|---|---|---|---|---|
| Polystyrene (PS) | 0.10-0.13 | 2.4-3.3 | 30-210 | 1.57 | Transparent | Amorphous |
| Polycarbonate (PC) | 0.19-0.22 | 4.6-5.2 | 66-70 | 1.58 | Transparent | Amorphous |
| Polyvinylchloride (PVC) (flexible) | 0.12-0.25 | 2.9-6.0 | 75-100 | 1.54 | Transparent | Amorphous |
| Polymethylmethacrylate (PMMA) | 0.17-0.19 | 4.0-4.5 | 70-77 | 1.49 | Transparent | Amorphous |
| Polypropylene (PP) | 0.10-0.22 | 2.4-5.2 | 100-180 | 1.49 | Translucent | Semi-crystalline |
| Polyethylene, Low Density (LDPE) | 0.33 | 7.9 | 100-200 | 1.51 | Translucent | Semi-crystalline |

The data obtained by the present inventors, though incomplete, support the following thermal conductivity guideline for selecting a suitable neutral density filter material for practicing the present invention. The thermal conductivity of the neutral density filter material at room temperature should not exceed approximately 0.13 W/m-K, which corresponds to the upper limit of the thermal conductivity range of polystyrene. Equivalently stated, the thermal conductivity of the ND filter at room temperature should not exceed approximately 3.3 cal/s-cm-K×$10^6$.

Generally speaking, thermoplastics are known to be useful for a variety of optical applications, especially amorphous or semi-amorphous (semi-crystalline) thermoplastics, as distinguished from crystalline thermoplastics. Thermoplastics are a preferred material genre for constituting the present invention's ND filter. Polystyrene, an amorphous, transparent, and heat-resistant thermoplastic, is a preferred thermoplastic for constituting the ND filter that is used in inventive practice.

Polystyrene is suitable mainly because of its optical and thermal properties. Significant physical properties that make polystyrene a particularly propitious material for viewing an arc weld site include its relatively low thermal conductivity, its relatively high LWIR transmission percentage (approximately 90%), its amorphous structure, and its transparency (e.g., clarity). Of all known plastics, polystyrene is among the most heat resistant. Polystyrene's attribute of thermal conductivity less than or equal to 0.13 W/m-K imparts resistance to overheating.

As shown in FIG. 1, distance d is the operating distance between the ND filter 30 and the arc weld site 40. Exemplary inventive practice provides for a minimum distance d of about two feet between the ND filter and the light/heat-emanative source, for viewing the light/heat-emanative source. Of course, the distance between the camera and the light-emanative source will necessarily be greater than the distance d between the ND filter and the light/heat-emanative source. It is reasonable for an inventive practitioner to expect that, under the majority of circumstances of distances d of two feet or greater (between the ND filter and the arc weld site), a polystyrene ND filter will be sufficiently heat-resistant as to not compromise the inventively performed imaging of the arc weld site. On the other hand, inventive testing of non-polystyrene thermoplastics had less propitious findings. The testing demonstrated that, even at distances d of two feet or greater, thermoplastics with a thermal conductivity of >0.13 W/m-K heated up rapidly, thus resulting in saturation of the uncooled LWIR camera's image focal plane array.

Distance d (e.g., between the ND filter and the arc weld) is significant in exemplary inventive practice with respect to both light transmission and heat transmission. Exemplary practice of the present invention provides that the ND filter be nearer to the camera than to the light/heat source. According to many inventive embodiments, the ND filter is proximate to the LWIR camera 20. For instance, ND filter 30 may be closely coupled with camera 20 in front of lens unit 21.

In consideration of the configurative relationships among the ND filter, the camera, and the heat/light source, distance d is a useful measurement for assessing the intensity of the LWIR that actually reaches the camera, when considered in conjunction with the LWIR transmittance of the ND filter. Distance d is also a useful measurement for assessing the intensity of the heat that actually reaches the camera, when considered in conjunction with the heat resistance (e.g., thermal conductivity) of the ND filter. The light intensity and the heat intensity originating from the light/heat source 40 will each decrease in accordance with increasing distance d, which is the distance between the ND filter and the light/heat source 40. A practitioner of the present invention can take into consideration various physical laws and phenomena pertaining to conveyance and transfer of electromagnetic energy and thermal energy, such as involving inverse square relationships.

An inventive practitioner may consider how the amount of LWIR attenuation by the ND filter varies in accordance with varying distances d, and may also consider how the amount of heat transmittance by the ND filter varies in accordance with varying distances d. An inventive practitioner may further consider the effects of changing distances between the camera and the ND filter, and/or between the camera and the light/heat source. An ND filter characterized by lesser LWIR attenuation and/or lesser heat resistance may be adequate for some applications that involve greater distances d. Tradeoffs may become manifest between optical influences and thermal influences in seeking optimal or near-optimal imaging. For instance, a shorter distance d may be worse from a thermal point of view (because the ND filter receives a greater amount of heat emanating from the light/heat source), but better from an optical point of view (because the ND filter attenuates a greater amount of LWIR emanating from the light/heat source).

Thermoplastic materials other than polystyrene may be suitable for given inventive applications. Polycarbonate and polypropylene are each a potential candidate to be ND filter material, since each at the lower end of its range has a thermal conductivity that is comparable to that of polystyrene, falling at or below the 0.13 W/m-K upper limit. In terms of optical properties, the attainment of a desired attenuation of LWIR may be problematical in the case of polypropylene, which is a translucent and semi-crystalline substance.

Previously known for IR applications are several non-thermoplastic materials, such as germanium (Ge), zinc selenide (ZnSe), zinc sulfide (ZnS), sodium chloride (NaCl), gallium arsenide (GaAs), and AMTIR-1 (GeAsSe; AMTIR-1 is an acronym for "amorphous material transmitting infrared radiation"). Non-thermoplastic materials such as these are common LWIR materials because of their high LWIR transmittance. However, as a general statement, non-thermoplastic materials would tend to be unsuitable for inventive practice because of their high thermal conductivities. For instance, the thermal conductivity of germanium is 60.2 W/m-K, about 463 times the 0.13 W/m-K upper limit recommended by the present inventors for practice of their invention.

Figure 4:
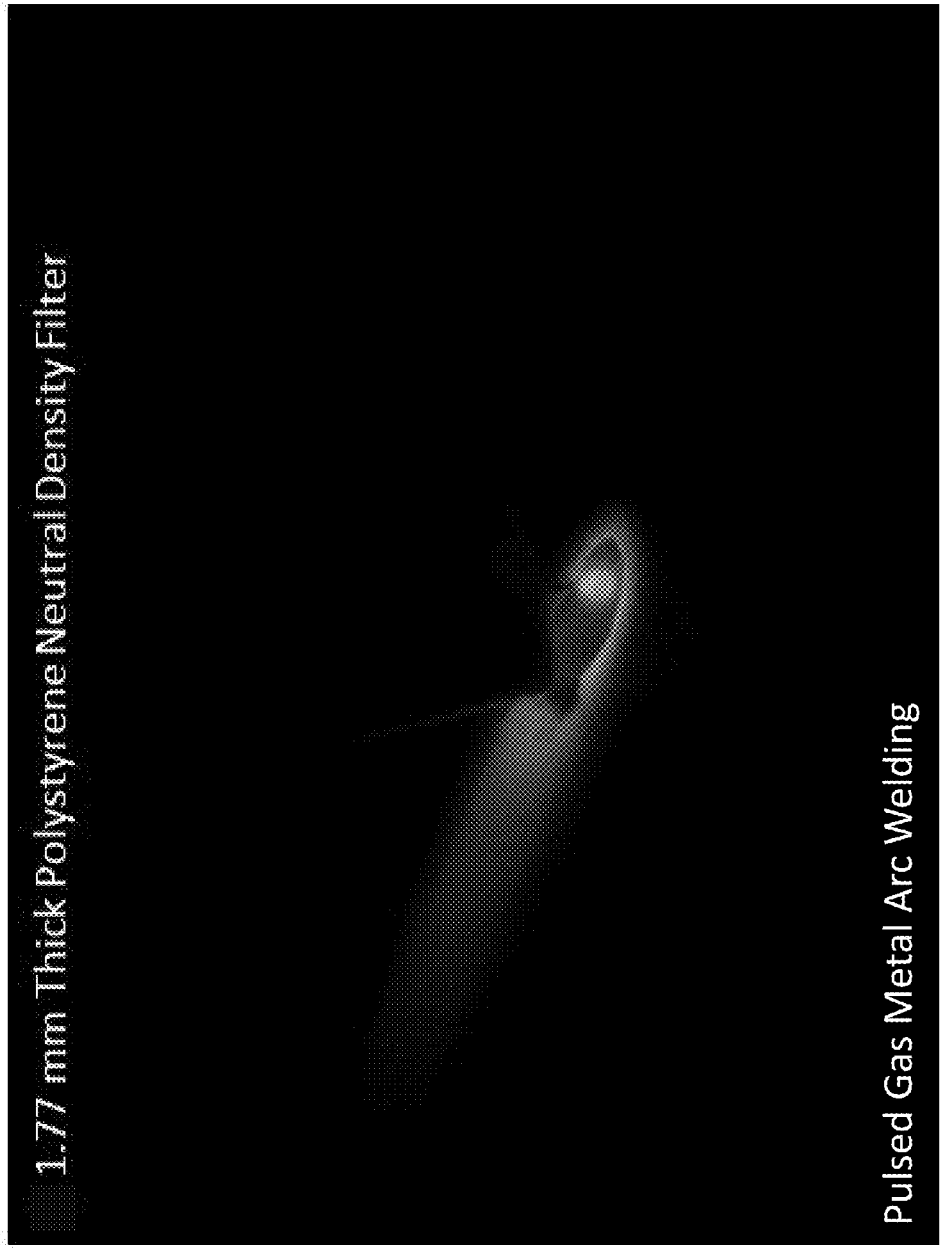
FIG. 4 is an example of a thermal image taken, in accordance with the present invention, of the pulsed gas metal arc welding process illustrated in FIG. 2 and FIG. 3. The image shown in FIG. 4 was obtained using a neutral density filter made of transparent polystyrene, having a planar shape, and having a thickness of 1.77 millimeters.
Figure 5:
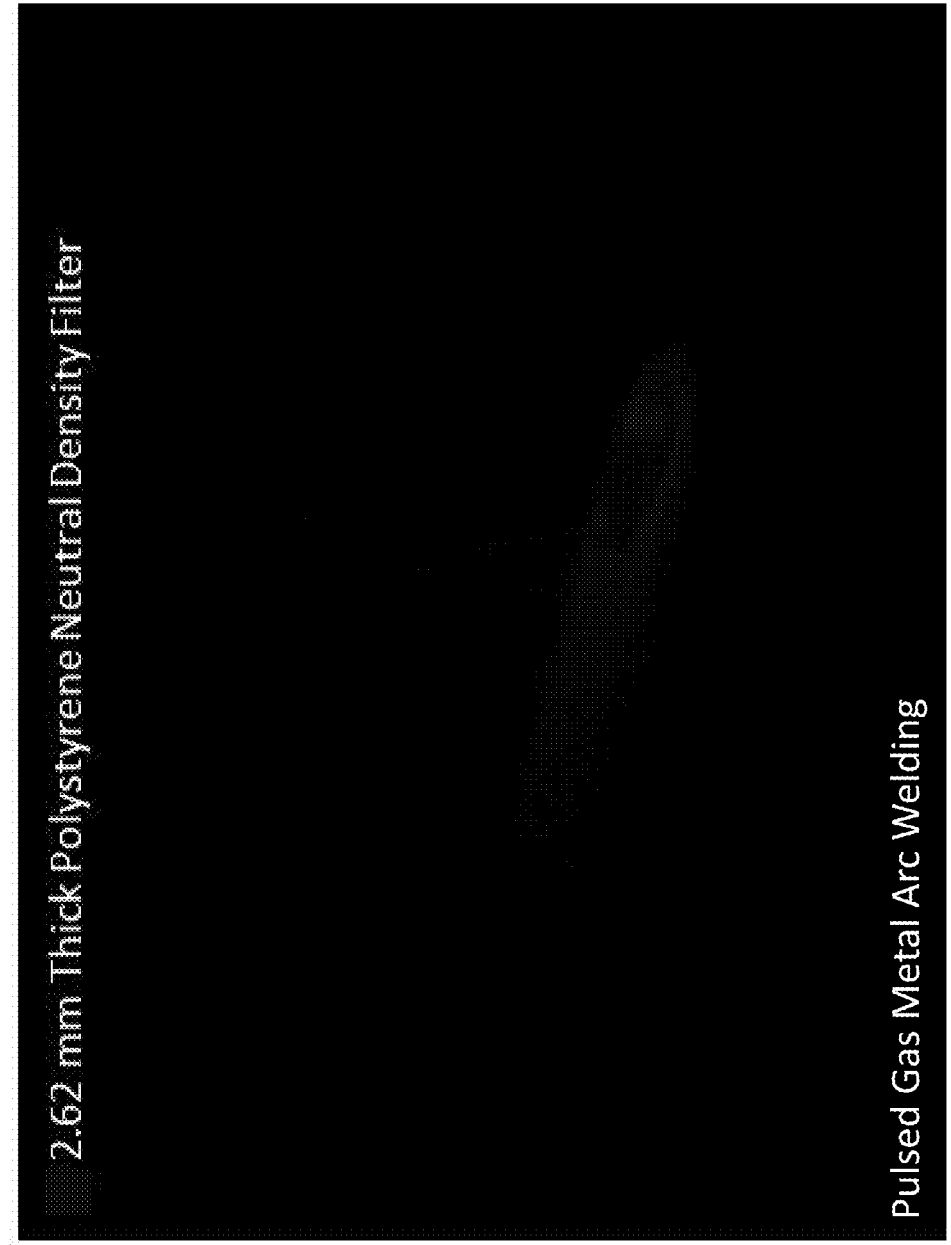
FIG. 5 is an example of a thermal image taken, in accordance with the present invention, of the pulsed gas metal arc welding process illustrated in FIG. 2, FIG. 3, and FIG. 4. The image shown in FIG. 5 was obtained using a neutral density filter made of transparent polystyrene, having a planar shape, and having a thickness of 2.62 millimeters.
Figure 6:
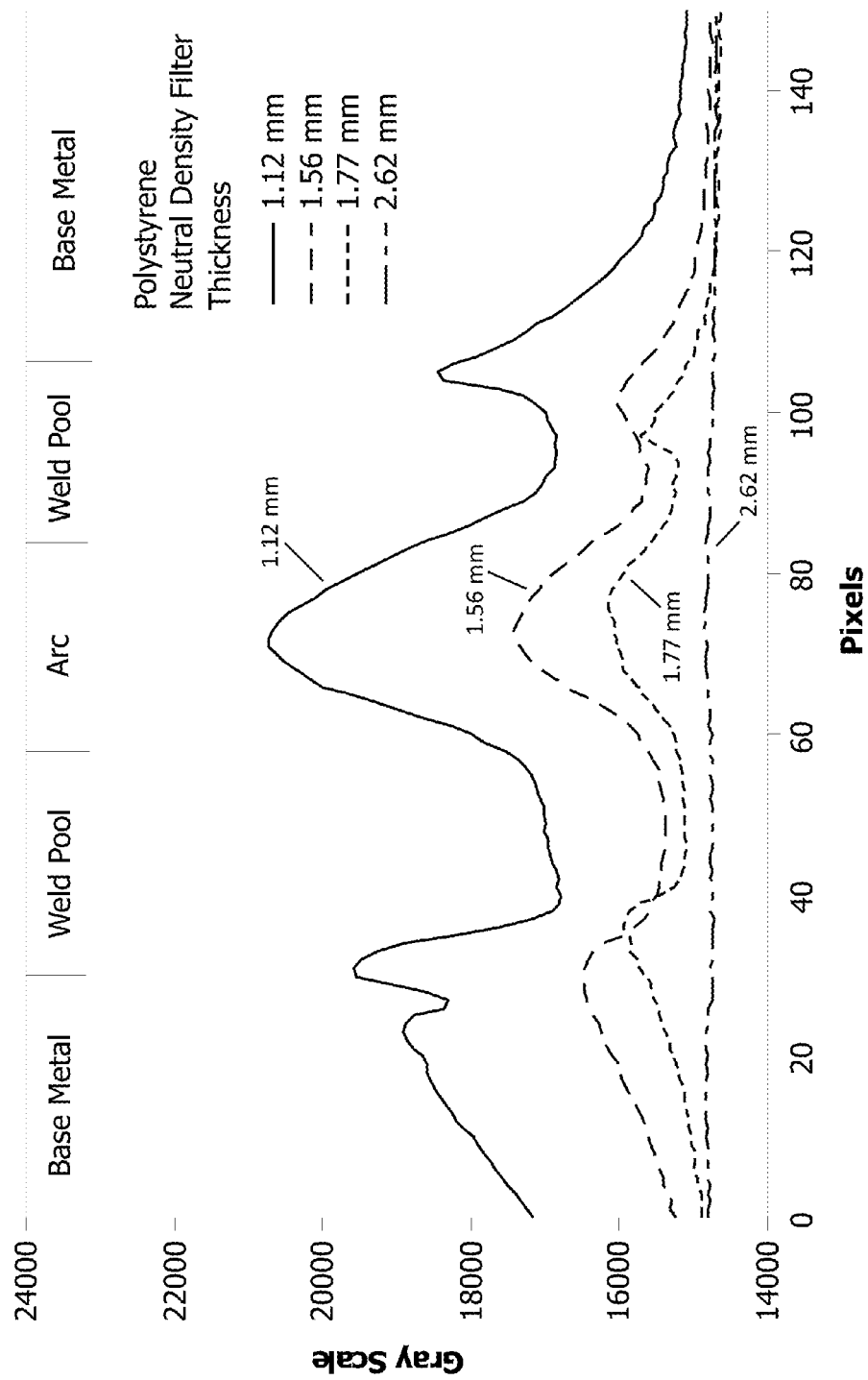
FIG. 6 is graph illustrating an example, in accordance with the present invention, of attenuation of LWIR as a function of filter thickness, i.e., the thickness of the neutral density filter. The four plots shown in FIG. 6 correspond to FIGS. 2 through 5.

With reference to FIGS. 2 through 6, inventive testing was conducted so as to compare neutral density (ND) filters 30 of varying thicknesses t. Each ND filter 30 at least substantially consisted of a transparent polystyrene pane, and was individually implemented in an inventive prototype IR imaging system that was operated with respect to a pulsed gas metal arc welding process. The photographic images of FIGS. 2 through 5, and the plot of FIG. 6, illustrate the effect of changing (increasing or decreasing) filter thickness on the image definition and overall image quality of identical welds made via the pulsed gas metal arc welding process. Contrast and brightness were normalized for each image to comparatively demonstrate how: (i) the LWIR signal was increasingly attenuated in accordance with increasing filter thickness; and, (ii) the quality of the resultant image was affected in accordance with the changing thickness of the ND filter.

Figure 2:
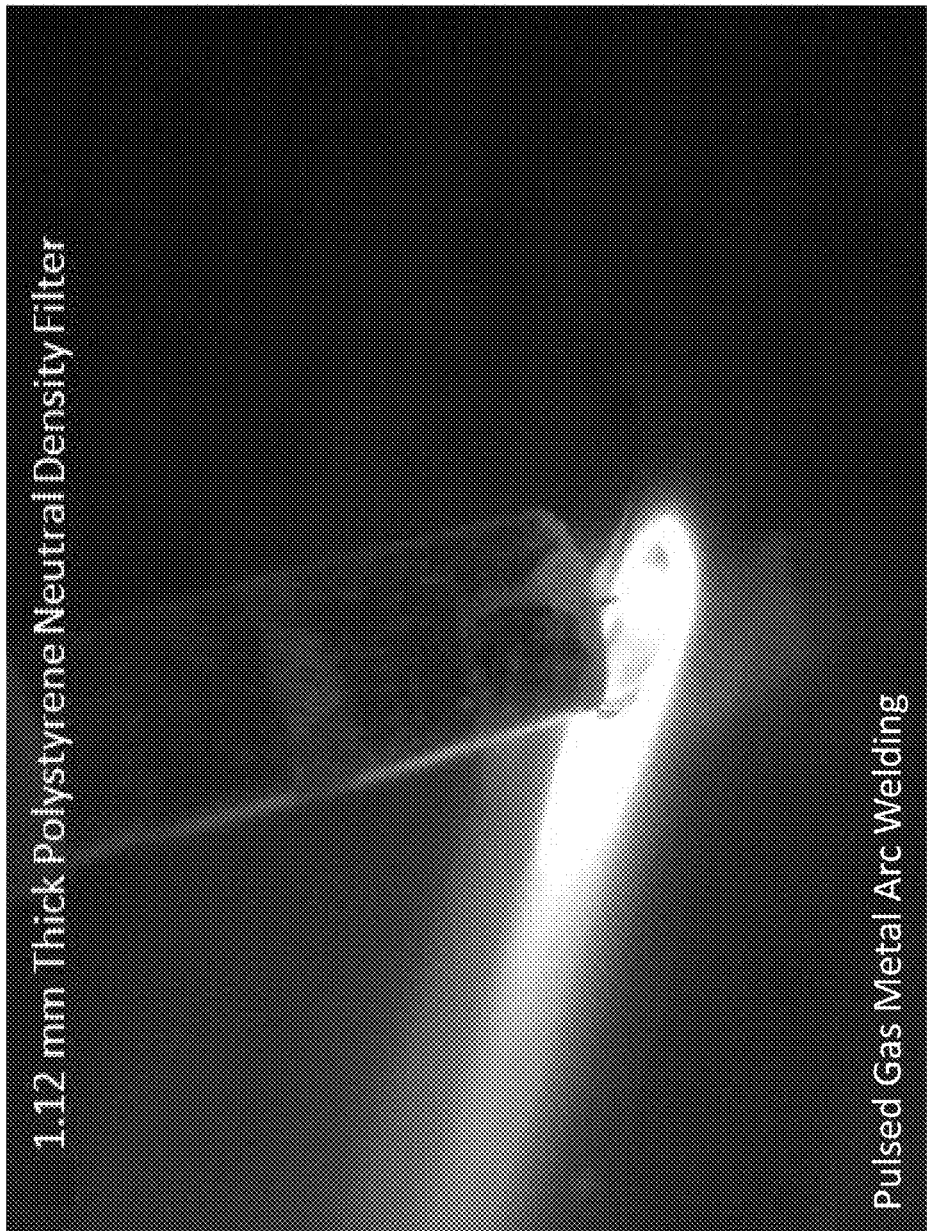
FIG. 2 is an example of a thermal image taken, in accordance with the present invention, of a pulsed gas metal arc welding process. The image shown in FIG. 2 was obtained using a neutral density filter made of transparent (clear or see-through) polystyrene, having a planar shape, and having a thickness of 1.12 millimeters.

FIGS. 2 through 5 show respective images of the same weld site. FIG. 2 shows an image collected using a 1.12 mm thick neutral density filter; the image of FIG. 2 is moderately under-attenuated. FIG. 3 shows an image collected using a 1.56 mm thick neutral density filter; the image of FIG. 3 is optimal, or nearly so. FIG. 4 shows an image collected using a 1.77 mm thick neutral density filter; the image of FIG. 4 is moderately over-attenuated. FIG. 5 shows an image collected using a 2.62 mm thick neutral density filter; the image of FIG. 5 is extremely over-attenuated. The image of FIG. 3 (1.56 mm thickness) is the best among the four respective images of FIGS. 2 through 5.

The images of FIG. 2 (1.12 mm thickness) and FIG. 4 (1.77 mm thickness) represent a less-than-optimal but possibly acceptable ground in terms of image quality, as they are not the best obtainable images but may be adequate for meeting the requirements of a given imaging effort. However, when using the 1.12 mm thick ND filter, the LWIR camera became saturated after only a short duration of exposure. Therefore, notwithstanding the fact that a reasonable image was collected using an ND filter of 1.12 mm thickness, the experimental testing demonstrated the impracticality of using the 1.12 mm thick ND filter to obtain an image.

FIG. 2 shows an image in which the LWIR signal to the camera is moderately under-attenuated. In the testing conducted by the present inventors, the ND filter thickness of 1.12 mm approximately demarcated the lower end of the practical range of ND filter thicknesses. FIG. 5 shows an image in which the LWIR signal to the camera is severely over-attenuated. The image of FIG. 5 is nearly completely dark. The ND filter thickness of 2.62 mm approximately demarcated the upper end of the practical range of ND filter thicknesses.

Reference is made to FIG. 6, which shows the linear profile plots of apparent radiance across a pulsed gas metal arc and weld pool. These plots characterize the magnitude of LWIR signal attenuation as a function of the thickness of the transparent polystyrene neutral density filter. Based on this data, the optimized polystyrene neutral density filter thickness for viewing the arc welding process with LWIR is approximately 1.5 mm.

FIGS. 3, 7, 8, and 9 are a series of images of a welding arc and weld pool, each image captured performing the method of the present invention. As illustrated by way of example in FIGS. 3, 6, and 7 through 9, exemplary practice of the present invention provides for observation of an arc welding process in the LWIR spectra using an optimized attenuating neutral density filter. Exemplary inventive practice provides a robust, relatively uncomplicated method of creating high-quality detailed images of a weld pool and welding arc in a variety of arc welding processes. Of note, the inventive method can be repeated using the same ND filter to create numerous images of diverse types of arc welding processes.

The present invention, which is disclosed herein, is not to be limited by the embodiments described or illustrated herein, which are given by way of example and not of limitation. Other embodiments of the present invention will be apparent to those skilled in the art from a consideration of the instant disclosure, or from practice of the present invention. Various omissions, modifications, and changes to the principles disclosed herein may be made by one skilled in the art without departing from the true scope and spirit of the present invention, which is indicated by the following claims.

What is claimed is:

1. An imaging method comprising:
    providing an imager operable in the longwave infrared spectral region of electromagnetic radiation; providing a neutral density filter characterized by transmission of longwave infrared radiation and by resistance to heat;
    positioning said neutral density filter between said imager and an entity emanating electromagnetic radiation and heat;
    imaging said entity, said imaging including using said imager and said neutral density filter, wherein said neutral density filter attenuates longwave infrared radiation emanating from said entity, said neutral density filter resists heat emanating from said entity, and said imager receives longwave infrared radiation attenuated by said neutral density filter;
    wherein said neutral density filter is made of a material having a thermal conductivity of greater than zero W/m-K and less than or equal to 0.13 W/m-K.

2. The imaging method of claim 1, wherein said neutral density filter is made of a thermoplastic.

3. The imaging method of claim 2, wherein said thermoplastic is polystyrene.

4. An imaging method comprising:
    providing an imager operable in the longwave infrared spectral region of electromagnetic radiation; providing a neutral density filter characterized by transmission of longwave infrared radiation and by resistance to heat; positioning said neutral density filter between said imager and an entity emanating electromagnetic radiation and heat; imaging said entity, said imaging including using said imager and said neutral density filter, wherein said neutral density filter attenuates longwave infrared radiation emanating from said entity, said neutral density filter resists heat emanating from said entity, and said imager receives longwave infrared radiation attenuated by said neutral density filter; wherein said neutral density filter is made of a thermoplastic and is characterized by at least one of: a thermal conductivity of greater than zero W/m-K and less than or equal to 0.13 W/m-K; a thickness in the range of 1 to 2 millimeters.

5. The imaging method of claim 4, wherein said neutral density filter is characterized by said thermal conductivity of greater than zero W/m-K and less than or equal to 0.13 W/m-K, and by said thickness in the range of 1 to 2 millimeters.

6. An imaging method comprising:
providing an imager operable in the longwave infrared spectral region of electromagnetic radiation; providing a neutral density filter characterized by transmission of longwave infrared radiation and by resistance to heat; positioning said neutral density filter between said imager and an entity emanating electromagnetic radiation and heat; imaging said entity, said imaging including using said imager and said neutral density filter, wherein said neutral density filter attenuates longwave infrared radiation emanating from said entity, said neutral density filter resists heat emanating from said entity, and said imager receives longwave infrared radiation attenuated by said neutral density filter; viewing an image obtained by said operating of said imager; at least once, repeating performance of the steps of said providing of said neutral density filter, said positioning of said neutral density filter, said operating of said imager, and said viewing of said image obtained by said operating of said imager; comparing the respective images obtained in the plural said performances of said steps; wherein in each said performance of said steps, said neutral density filter is made of a thermoplastic having a thermal conductivity of greater than zero W/m-K and less than or equal to 0.13 W/m-K.

7. An imaging method comprising:
providing an imager operable in the longwave infrared spectral region of electromagnetic radiation; providing a neutral density filter characterized by transmission of longwave infrared radiation and by resistance to heat; positioning said neutral density filter between said imager and an entity emanating electromagnetic radiation and heat; imaging said entity, said imaging including using said imager and said neutral density filter, wherein said neutral density filter attenuates longwave infrared radiation emanating from said entity, said neutral density filter resists heat emanating from said entity, and said imager receives longwave infrared radiation attenuated by said neutral density filter; viewing an image obtained by said operating of said imager;
at least once, repeating performance of the steps of said providing of said neutral density filter, said positioning of said neutral density filter, said operating of said imager, and said viewing of said image obtained by said operating of said imager; comparing the respective images obtained in the plural said performances of said steps; wherein in each said performance of said steps, said neutral density filter has a thickness in the range of 1 to 2 millimeters.

8. The imaging method of claim 7, wherein in each said performance of said steps, said neutral density filter is made of a thermoplastic having a thermal conductivity of greater than zero W/m-K and less than or equal to 0.13 W/m-K.

9. An imaging method comprising:
providing an imager operable in the longwave infrared spectral region of electromagnetic radiation; providing a neutral density filter characterized by transmission of longwave infrared radiation and by resistance to heat; positioning said neutral density filter between said imager and an entity emanating electromagnetic radiation and heat; imaging said entity, said imaging including using said imager and said neutral density filter, wherein said neutral density filter attenuates longwave infrared radiation emanating from said entity, said neutral density filter resists heat emanating from said entity, and said imager receives longwave infrared radiation attenuated by said neutral density filter; viewing an image obtained by said operating of said imager; at least once, repeating performance of the steps of said providing of said neutral density filter, said positioning of said neutral density filter, said operating of said imager, and said viewing of said image obtained by said operating of said imager; comparing the respective images obtained in the plural said performances of said steps; wherein said neutral density filter is characterized by a thickness and a material, and wherein in each said performance of said steps, said step of providing said neutral density filter includes providing a said neutral density filter that differs from said neutral density filter of at least one other said performance in terms of said material characterizing said neutral density filter, or said thickness characterizing said neutral density filter, or both said material and said thickness characterizing said neutral density filter; wherein in each said performance of said steps, said material characterizing said neutral density filter is a thermoplastic having a thermal conductivity of greater than zero W/m-K and less than or equal to 0.13 W/m-K.

10. An imaging method comprising:
providing an imager operable in the longwave infrared spectral region of electromagnetic radiation; providing a neutral density filter characterized by transmission of longwave infrared radiation and by resistance to heat; positioning said neutral density filter between said imager and an entity emanating electromagnetic radiation and heat; imaging said entity, said imaging including using said imager and said neutral density filter, wherein said neutral density filter attenuates longwave infrared radiation emanating from said entity, said neutral density filter resists heat emanating from said entity, and said imager receives longwave infrared radiation attenuated by said neutral density filter; viewing an image obtained by said operating of said imager; at least once, repeating performance of the steps of said providing of said neutral density filter, said positioning of said neutral density filter, said operating of said imager, and said viewing of said image obtained by said operating of said imager; comparing the respective images obtained in the plural said performances of said steps; wherein said neutral density filter is characterized by a thickness and a material, and wherein in each said performance of said steps, said step of providing said neutral density filter includes providing a said neutral density filter that differs from said neutral density filter of at least one other said performance in terms of said material characterizing said neutral density filter, or said thickness characterizing said neutral density filter, or both said material and said thickness characterizing said neutral density filter; wherein in each said performance of said steps, said thickness characterizing said neutral density filter is in the range of 1 to 2 millimeters.

11. The imaging method of claim 10, wherein in each said performance of said steps, said material characterizing said neutral density filter is a thermoplastic having a thermal conductivity of greater than zero W/m-K and less than or equal to 0.13 W/m-K.

12. An imaging apparatus comprising a camera and a neutral density filter, said camera operable in the longwave infrared spectral region of electromagnetic radiation, said neutral density filter characterized by transmission of longwave infrared radiation and by resistance to heat, said neutral density filter positioned between said camera and said entity, wherein said imaging apparatus is capable of producing at least one image of an entity emanating electromagnetic radiation and heat, said neutral density filter attenuating longwave infrared radiation emanating from said entity and resisting heat emanating from said entity, said camera receiving longwave infrared radiation attenuated by said neutral density filter, wherein said neutral density filter is made of a material having a thermal conductivity of greater than zero W/m-K and less than or equal to 0.13 W/m-K.

13. The imaging apparatus of claim 12 wherein said neutral density filter is made of a thermoplastic.

14. An imaging apparatus comprising a camera and a neutral density filter, said camera operable in the longwave infrared spectral region of electromagnetic radiation, said neutral density filter characterized by transmission of longwave infrared radiation and by resistance to heat, said neutral density filter positioned between said camera and said entity, wherein said imaging apparatus is capable of producing at least one image of an entity emanating electromagnetic radiation and heat, said neutral density filter attenuating longwave infrared radiation emanating from said entity and resisting heat emanating from said entity, said camera receiving longwave infrared radiation attenuated by said neutral density filter, wherein said neutral density filter has a thickness in the range of 1 to 2 millimeters.

15. The imaging apparatus of claim 14, wherein said neutral density filter is made of polystyrene.

16. The imaging apparatus of claim 14, wherein said neutral density filter is made of a material having a thermal conductivity of greater than zero W/m-K and less than or equal to 0.13 W/m-K.

* * * * *